W. MAIN.
TUBE MILL GRINDER.
APPLICATION FILED APR. 3, 1912.

1,043,855.

Patented Nov. 12, 1912.

WITNESSES
Jessie B. Kay.
Charles Eberhart.

INVENTOR
William Main
BY
Duncan & Duncan ATTORNEYS

UNITED STATES PATENT OFFICE.

WILLIAM MAIN, OF PIERMONT, NEW YORK.

TUBE-MILL GRINDER.

1,043,855.　　　　Specification of Letters Patent.　　Patented Nov. 12, 1912.

Application filed April 3, 1912. Serial No. 688,272.

*To all whom it may concern:*

Be it known that I, WILLIAM MAIN, a citizen of the United States, and resident of Piermont, county of Rockland, State of New York, have made certain new and useful Inventions Relating to Tube-Mill Grinders, of which the following is a specification, taken in connection with the accompanying drawing.

This invention relates to grinders suitable for use in tube mills and the like, these grinders being formed of metal and having thin flattened lenticular form, the convex faces of the grinders comprising large radius cylindrical or spherical portions so as to insure large area grinding contact between these grinders when used under tube mill conditions.

Figure 1:
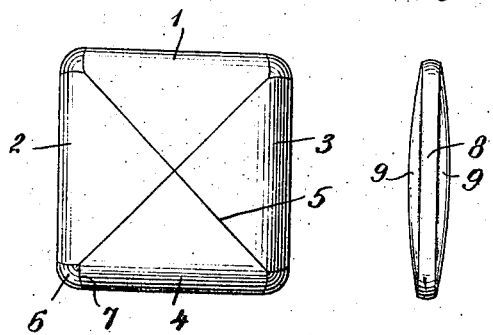
Figure 2:
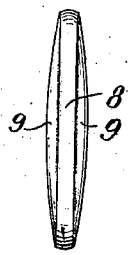
Figure 3:
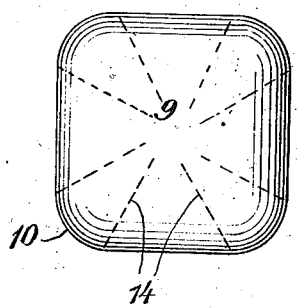
Figure 4:
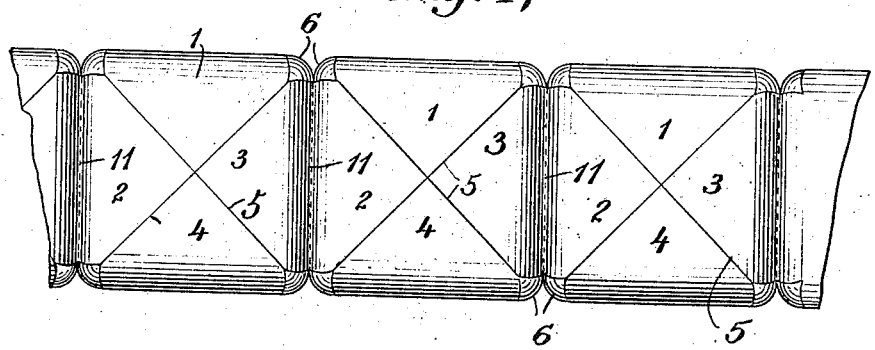
Figure 5:
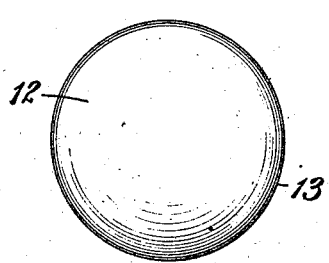

In the accompanying drawing showing in a somewhat diagrammatic way certain illustrative embodiments of this invention, Figure 1 is a face view of one form of grinder. Fig. 2 is an edge view of another form, and Fig. 3 the corresponding face view. Fig. 4 shows a blank from which may be formed individual grinders as are shown in Fig. 1. Fig. 5 is a face view of another form of grinder; and Fig. 6 an edge view thereof.

These metallic grinders are preferably given a thin lenticular form so as to have their flattened convex grinding surfaces comprise portions having large radius cylindrical surfaces or large radius spherical elements to insure correspondingly large area grinding contact between the grinders which may have either circular or substantially polygonal or rectangular convex faces with rounded corners. Fig. 1 shows one form of such lenticular grinders, which may be provided with substantially rectangular convex faces having rounded corners such as 6 and comprise the large radius cylindrical portions such as 1, 2, 3 and 4, starting from the rounded edges and meeting in the diagonal intersecting lines 5, these cylindrical portions being, if desired, carried sharply into the rounded corners 6 so as to form the intersecting lines 7 in connection therewith. If desired, however, the grinders may have their corners rounded considerably more so as to have such decidedly rounded corners 10 as shown in Fig. 3 and the substantially cylindrical large radius portions between the dotted lines 14 may gradually merge into each other so as to make the convex faces 9 of these grinders more smoothly curved and somewhat more nearly a large radius spherical convex surface, the edge 8 of this grinder being preferably rounded as indicated in Fig. 2. It is of course understood that under service conditions the grinders tend to wear so as to smooth off all sharp edges so that the sharp intersecting edges of Fig. 1 would in the course of time be rounded off and make this form of the grinders more nearly approach that shown in Fig. 3.

These grinders are preferably made small so as to increase the number of grinders and correspondingly increase the amount of grinding contact between their respective surfaces under tube mill conditions, for instance. These lenticular grinders may with good results be between an inch and an inch and a half or so across and have a thickness of a quarter of an inch or more. These grinders may be made in any desired way and of any suitable material, preferably chilled or hardened to minimize wear. Manganese steel is of course highly desirable for conditions where durability and resistance to abrasion are important and such manganese steel grinders may be formed by forging or shaping in any desired way.

If desired, the grinders may be formed by simultaneously casting a large number of these grinders in rows or sheets between suitable chills to harden the same and then breaking the grinders apart along the thin lines of severance formed between them, as is indicated somewhat diagrammatically in Fig. 4. In that case a single row of these grinders is shown joined together along the thinned lines of severance 11 along which the grinders may of course be readily broken apart and if desired the edges may be somewhat smoothed or rounded, although of course this is rapidly effected when the grinders are used in a tube or ball mill. By using the customary weight of these lenticular grinders in a tube mill for instance, the number of grinding contacts is greatly increased and the convex form of their grinding faces secure sufficient intensity of grinding pressure to insure proper reducing action, while at the same time the large radius of these curved grinding surfaces gives ample grinding contact to make the reduction efficient.

Figure 6:
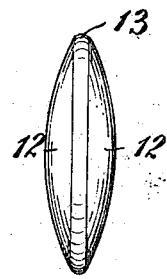

Another form of grinder is shown in Figs. 5 and 6 as having substantially circular convex faces 12 which may be composed of large radius spherical portions, the grinder being preferably formed with a suitably rounded edge 13, and having a thickness of half an inch or so.

Having described this invention in connection with a number of illustrative embodiments, forms, proportions, materials and methods of manufacture, to the details of which disclosure the invention is not of course to be limited, what is claimed as new and what is desired to be secured by Letters Patent is set forth in the appended claims.

I claim—

1. The thin lenticular hard metallic grinders suitable for use in tube mills and the like and having substantially rectangular convex faces having rounded corners and edges and comprising four intersecting convex face portions of large radius to insure large area grinding contact between the grinders under service conditions, said grinders being about an inch and a half across and between about one-quarter and one-half of an inch thick.

2. The thin lenticular hard metallic grinders suitable for use in tube mills and the like and having substantially convex faces having rounded corners and edges and comprising a plurality of convex face portions of large radius to insure large area grinding contact between the grinders under service conditions, said grinders being between about an inch and an inch and a half across and between about one quarter and one half of an inch thick.

WILLIAM MAIN.

Witnesses:
 HARRY L. DUNCAN,
 JESSIE B. KAY.